United States Patent [19]

Kaderabek

[11] 4,358,661
[45] Nov. 9, 1982

[54] ELECTRIC SOLDERING IRON WITH VIBRATORY SOLDERING BIT

[76] Inventor: Milos Kaderabek, Raiffeisenstrasse 14 a,, D-7000 Stuttgart 31, Fed. Rep. of Germany

[21] Appl. No.: 130,044

[22] Filed: Mar. 13, 1980

[30] Foreign Application Priority Data

Jul. 17, 1979 [DE] Fed. Rep. of Germany ....... 2928827

[51] Int. Cl.³ .......................... B23K 3/04; B23K 1/06
[52] U.S. Cl. ................................... 219/230; 219/236;
219/241; 219/242; 228/1 A; 228/51; 248/117.2;
248/206 A
[58] Field of Search ........................ 219/221, 227–242;
228/51–55, 1 A; 248/117.2, 206 A

[56] References Cited

U.S. PATENT DOCUMENTS

| | | | |
|---|---|---|---|
| 1,520,597 | 12/1924 | Reavis | 228/51 |
| 1,988,827 | 1/1935 | Bennett | 219/236 |
| 2,283,343 | 5/1942 | Weiskopf | 219/227 X |
| 2,454,875 | 11/1948 | Hyde | 219/230 X |
| 2,709,743 | 5/1955 | Mitchell | 219/238 |
| 2,803,735 | 8/1957 | Jones | 228/1 A |
| 2,815,430 | 12/1957 | Weiss | 219/230 X |
| 2,830,165 | 4/1958 | Carlin | 228/1 A |
| 2,866,069 | 12/1958 | Kriwaczek | 228/1 A X |
| 2,902,577 | 9/1959 | Brown | 228/1 A |
| 3,336,462 | 8/1967 | Fuller | 219/227 |
| 3,443,780 | 5/1969 | Bruening | 248/117.2 |
| 3,599,358 | 8/1971 | Butts et al. | 248/117.2 |
| 3,852,565 | 12/1974 | Kager | 219/230 X |

FOREIGN PATENT DOCUMENTS

| | | | |
|---|---|---|---|
| 885077 | 11/1971 | Canada | 219/229 |
| 905507 | 4/1945 | France | 219/238 |
| 1580920 | 8/1969 | France | 248/206 A |
| 556609 | 10/1943 | United Kingdom | 219/238 |
| 216861 | 4/1968 | U.S.S.R. | 219/230 |

Primary Examiner—A. Bartis
Attorney, Agent, or Firm—Horst M. Kasper

[57] ABSTRACT

An electric soldering iron includes an electric heating element mounted on an elongated stem rigidly secured in cantilever fashion at one end to a casing having a pistol grip handle. A soldering bit surrounds the heating element in spaced relation thereto for receiving heat essentially by radiation therefrom and is supported on one end of a protective tube resiliently mounted at its other end to the casing independently of the stem. A vibrator elastically mounted in the casing is coupled to the protective tube for vibrating the soldering bit at a frequency of 10-100 Hz without effecting vibration of the heating element. The handle is provided with a magnet for maintaining the soldering iron in an upright position on a stand comprising an iron plate adapted to be secured to a surface by vacuum cups. The soldering iron is provided with an adjustable light for illuminating the work area and an electronic heater control for regulating the soldering bit temperature. A layer of insulating material and a ceramic jacket cover all but the tip of the soldering bit to reduce heat loss and protect the bit.

9 Claims, 5 Drawing Figures

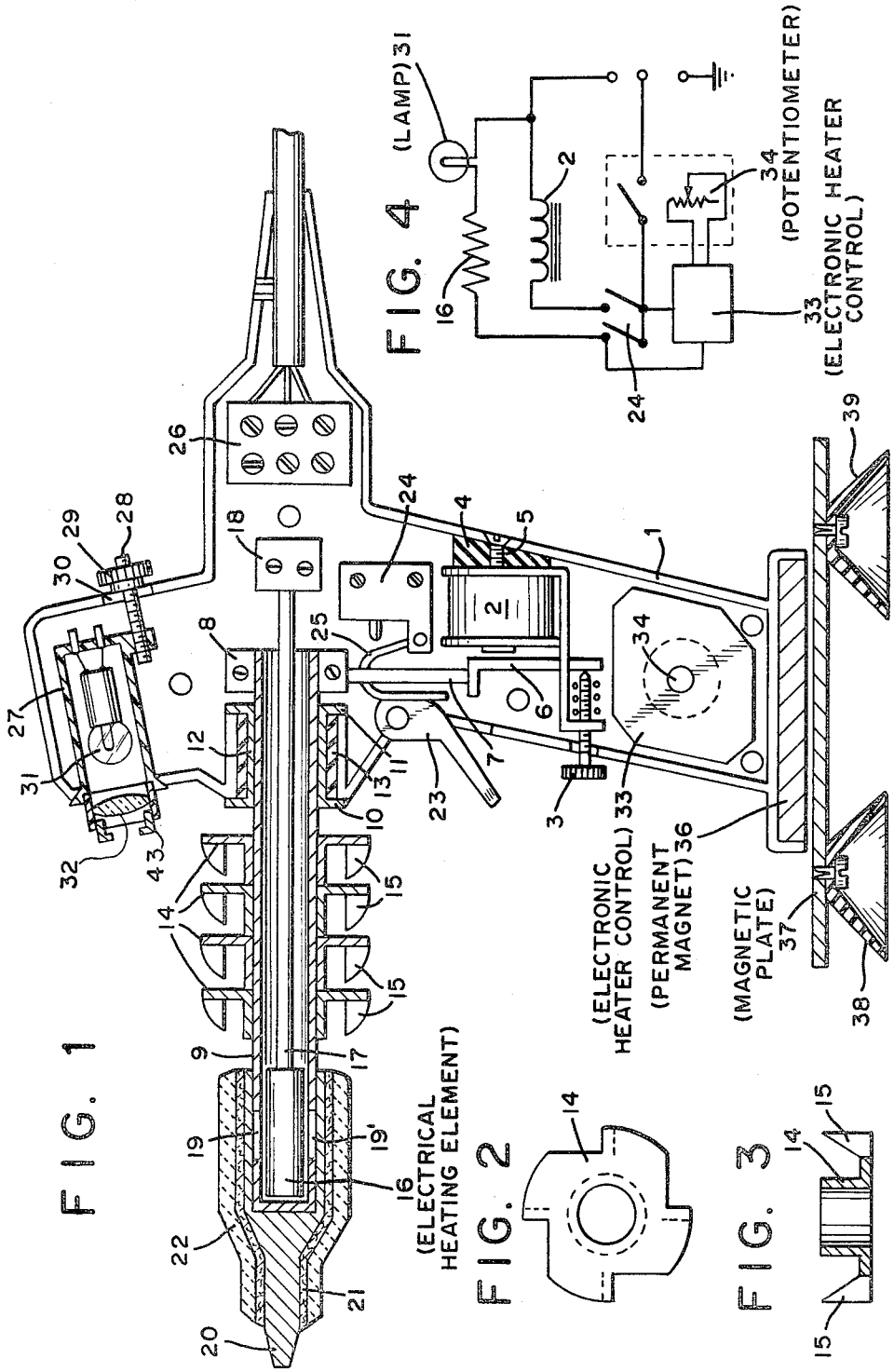

ELECTRIC SOLDERING IRON WITH VIBRATORY SOLDERING BIT

BACKGROUND OF THE INVENTION

1. Field of the Invention

The present invention relates to an electric soldering iron and in particular to a soldering iron having a vibrating bit separated from the heating element.

2. Brief Description of the Background of the Invention Including Prior Art

All electric soldering irons and soldering equipment made so far show considerable losses in heating energy due to the unimpeded heat radiation from the soldering bits into the ambient, so that only part of the heating energy is utilized and the heat sensitive components located near the soldering bits may be damaged. Furthermore, the solder moves up to the part with greater heat as the soldering bit is heated up, thus causing erosions which are destructive to the bit. The solder drops developed at these points by the accumulation of the solder will often flood the joints by suddenly flowing off, thus leading to trouble, or it will become necessary to draw the solder off. The cooling of the protective casing is mostly inadequate and when handling the tool without the care required there may be danger of thermal burns or of damage to other objects. In the electric soldering irons and soldering equipment manufactured so far which have soldering bits featuring high or low-frequency oscillations, the heating element will also vibrate at the same time due to its fastening to the vibrator; and the heater winding, which is sensitive to vibration when glowing, will become interrupted within a short period of time, due to constant vibrations. Also the axial arrangement of the exciting coil of the vibrator near the hot protective casing and its firm connection with the magnet will cause the immediate transfer of heat to the exciting coil and may thus become destructive of the winding.

When the exciting coil of the vibrator is subject to an alternating current, a magnetic alternating field is generated, which causes the magnetically soft iron parts of the vibrator to vibrate.

The stationary lamp bulb built into the grip casing manufactured so far for illumination of the joint being soldered causes the circle of light to light beyond the joint when using soldering bits which become shorter by wear; and since there is no mask, such a bulb is merely a nuisance for the operator, because of the dazzling effect on the eye.

The control of the temperature so far practiced outside of the soldering iron by transformers or by electronic means requires plenty of room. The pulling out of the plug from the socket which becomes necessary in directly heated soldering irons when working is to be interrupted, results in delays in the work; and the fact that no signal lamp or fuse is directly arranged on the soldering iron may also lead to damage to the soldering iron or to the environment, due to continuous heating. The power supply through a cable entering the tool at the handle of axial design or at the bottom of the piston grip constitutes a disadvantage. In greater cable lengths, a constant tension caused by the weight of the cable will develop which may compensate the soldering iron's weight, thus causing an instable state and, if carelessly placed on the stand or if the cable is inadvertently touched, the soldering iron may easily drop to the ground, thus interrupting the glowing heater winding by the impact or damaging other objects. Placing the soldering iron onto a surface during working is usually troublesome, because the support fastened to the soldering irons's casing is an impediment. The stands are not stationary enough, they occupy much space and they also take heat from the soldering iron. In a stand design with the soldering bit pointing downwards, the protective casing and the handle become excessively heated by the ascending heat.

SUMMARY OF THE INVENTION

This invention relates to an electric soldering iron with a pistol grip, a slip-on soldering bit providing external heat insulation, a bit vibrator for vibrating the bit at an oscillation frequency from 10 to 100 Hz, an electronically controlled heating element for heating the bit, adjustable illumination of the joint being soldered and a permanent magnet incorporated in the base of the pistol grip for holding the tool firmly on an iron plate, provided with vacuum cups for attachment to a surface.

The damped heat radiation from the soldering bits with external heat insulation means an energy saving of at least 25 percent; and thus, it does not constitute a danger to any objects located in the near vicinity. The bits cannot oxidize, drop formation of the solder on the bit and bit erosions are avoided. Heat is only concentrated on the bit's small free surface, thus permitting the solder to be applied sparingly and the joint to be warmed up rapidly. A better utilization of the energy is achieved in soldering irons with a slip-on soldering bit by perforating the protective casing over the area of the heating element, and at the same time, heating of the protective casing is reduced.

For damping the oscillations, there is a metal bush with flanges provided with an elastic insert to allow for sliding movement of the protective casing. For cooling purposes, individual plug-on segments with bushes are arranged on the protective casing; the shape of these segments with tips bent at right angles permits improved cooling and protection against touching the hot protective casing. The advantage of the individual segments is that they can be adapted to any length of the protective casing.

The adverse vibration of the heating element is eliminated in that the heating element features a self-supporting arrangement from a long metal stem inside the protective casing; the end of the long metal stem being mounted on a terminal inside the grip casing, so that only a small amount of heat is transferred into the casing, due to the great length of the stem. The vibrator is mounted on an elastic support in the center of the pistol grip. It consists of an exciting coil with a cylindrical iron core and an oscillating plate which, with an extension arm whose end takes the shape of a terminal, embraces the free end of the protective casing. Because of the length of the arm, only a small amount of heat is transferred to the vibrator. The oscillation frequency is adjusted by a bolt arranged on the vibrator. The pistol grip consists of two covers screwed together, with a plastic cylinder, a lamp bulb and a detachable colored mask being arranged in the top wall, so that the angle of lighting can be adjusted by raising or lowering the rear section by a bolt which slides into a slot cut into the upper side of the covers of the soldering iron. The colored mask prevents dazzling of the eyes and contact with live parts. The bulb with its focussing lens is at the same time used as a fuse, signal lamp and for visual setting of the preheating.

The lower portion of the pistol grip accommodates the electronic control with scale and button for accurate setting of the preheating or for switching off, so that the soldering iron can permanently remain connected to the wall socket. When soldering, the electronic control is short circuited and the vibrator switched on by operating a trigger. At the same time the bulb connected in series with the heating element will fully light up. The soldering iron can also be operated from low voltage after exchanging the heating element, the bulb and the cable. The cable is inserted into a large extension end at the top portion of the grip and directed to the rear. This provides a removed and preferably large-size loop of the cable, avoiding any inadvertant contact. The permanent magnet built in the base of the pistol grip holds the soldering iron in an upright position on an iron plate, which is provided with vacuum cups underneath. The upright position of the soldering iron provides an improved cooling of the protective casing and it permits safe handling, so that the soldering iron may be placed on an iron plate without taking any particular care. All components of the soldering iron are easy to manufacture and lend themselves for quantity production.

BRIEF DESCRIPTION OF THE DRAWING

In the accompanying drawing in which are shown various of the possible embodiments of the present invention.

FIG. 1 is a sectional view through the soldering iron of the invention;

FIG. 2 is a plan view on an individual cooling element as employed in the soldering iron of FIG. 1;

FIG. 3 is a sectional view of the individual cooling element shown in FIG. 2;

FIG. 4 is a view of a schematic diagram of the electric circuit of the soldering iron of FIG. 1;

DESCRIPTION OF INVENTION AND PREFERRED EMBODIMENTS

Figure 5:
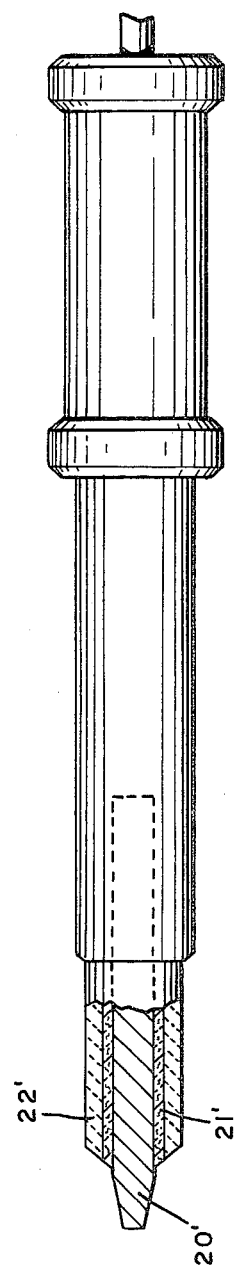
FIG. 5 is a view in part sectional and in part elevational of a further embodiment of a soldering iron.

According to the invention, FIG. 1 is a cutaway view showing the handle in the form of a pistol grip which consists of two cover halves screwed together. Inside the cover half (1), the vibrator (2), with adjusting screw (3) arranged for setting the oscillations from 10 to 100 Hz, is fastened to cover (1) by screw (5), together with an elastic support (4). The vibrating iron plate (6) of vibrator (2) is provided with a long arm (7), whose end takes the form of an attachment terminal (8) embracing the protective casing (9) shown in cross-section. The protective casing (9) is slidably mounted in the metal bush (12). The metal bush (12) is resiliently mounted to the cover half (1) representing a handle via an elastic insert (13) and is provided with flanges (10), (11).

Individual cooling segments (14) are placed on the protective casing (9), with the tips (15) of the segments being bent relative to the segment plane at right angles. These are shown in FIG. 2 as a top view and in FIG. 3 as a cross-section.

The tips (15) of the cooling segments (14) are bent at about a right angle relative to the cooling segment (14) plane and causes a turbulent flow of the air resulting in increased heat transfer and in improved cooling efficiency.

Inside the protective casing (9), the heating element (16) is connected to one end of the metal stem (17) in a self supporting arrangement; the other end of stem (17) is connected to connecting provision (18) in cover (1). The end of the protective casing (9) is slotted (19), (19') in the area of the heating element (16). The soldering bit (20) is attached to the protective casing and is covered by an insulating material (22) such as a ceramic material or other heat insulating composition.

In order to counteract the deformational forces, the soldering bit is covered with an insulating layer (21) made of a suitable material. The insulating layer (21) is surrounded by a heat insulating jacket (22) of ceramic. Thus the insulating layer can be formed as a removable relatively thin shell providing considerable heat insulation. Such a shell does not disturb the operation of the soldering gun and its weight is relatively small compared to the weight of the soldering iron. When employing homogeneous insulating materials it is necessary to apply a relatively thick layer based on the relatively higher thermal conductivity, which can be interfering based on the larger volume and the higher weight.

The double switch (24) is switched on by operating trigger (23) through flat spring (25). The top portion of cover (1) accommodates the terminal block (26) together with a power supply cable. A cylinder (27) molded of plastic material is movably arranged on the upper wall of cover (1); at the end of the cylinder there is a bolt (28) fastened in a holder. The belt extends through a slot (30) and has a knurled nut (29) for adjusting the cylinder and thereby the lamp bulb (31) together with the focusing lens (32) inside the cylinder (27) and possibly a mask (43) detachably mounted on the front of the cylinder (27) to adjust the angle of the lighting. The bottom portion of cover (1) incorporates the electronic control (33) for the heating element (16). An adjustable potentiometer 34 for setting temperature including a switch is provided in the handle for adjusting the temperature.

All individual parts can be produced by automatic machines and the manual labor can only comprise the assembly.

The permanent magnet (36) mounted in the base (35) of cover (1) holds the soldering iron in an upright position on iron plate (37); the iron plate is provided with vacuum cups (38), (39) underneath, to obtain a firm hold on the work surface.

FIG. 4 shows the circuit of the soldering iron with electronic control (33), double switch (24), heating element (16), vibrator winding (2), potentiometer (34) with switch and bulb (31), which at the same time also serves as a fuse.

The electronic control (33) comprises conventional control elements.

According to the invention, the cross section in FIG. 5 shows the soldering bit (20') projecting from the electric soldering iron or soldering equipment, the soldering bit being surrounded by a jacket (22') made of insulating material and, if ceramic material is used, the interior is filled with an insulating layer (21') counteracting any deformation forces. This embodiment can also be manufactured as a measure of economy and protection of the appropriate size and can subsequently be used with all soldering bits.

I claim:

1. An electric soldering iron comprising an electric heating element secured at one end to an end of an elongated stem;

a casing including
- a support section having means rigidly mounting the other end of the stem in the casing with the heating element extending forwardly out of the casing in cantilever fashion, and
- a handle connected to the support section;

a vibrator mounted in the casing via an elastic member; an elongated soldering bit;

a resilient mounting means supporting the elongated soldering bit from said casing independently of and spaced from the heating element and stem and with the soldering bit surrounding the heating element in spaced relationship thereto for transferring thermal energy from the heating element to the soldering bit essentially by heat radiated from the heating element and said resilient mounting means being coupled to the vibrator whereby the vibrator can vibrate the resilient mounting means and the soldering bit without effecting vibration of the heating element;

means to selectively energize the heating element; and means to selectively energize the vibrator.

2. The electric soldering iron according to claim 1 wherein the resilient mounting means includes a tubular protective casing coupled to the vibrator and disposed around the heating element and provided with perforated slots in the area of the heating element.

3. The electric soldering iron according to claim 2 wherein said protective casing is coupled to a vibrating plate on the vibrator by a linkage means.

4. The electric soldering iron according to claim 2 further comprising
- an insulating layer covering all but the tip of the soldering bit; and
- a jacket made from ceramic material and surrounding the insulating layer with the tip of said bit exposed.

5. The electric soldering iron according to claim 2 further comprising
- cooling segments attached to the protective casing with individual cooling segments having tips bent at right angles to the plane of the cooling segment.

6. The electric soldering iron according to claim 1 further comprising
- a plastic cylinder attached to the support section;
- a light source disposed in the plastic cylinder for illuminating the area being soldered, said plastic cylinder being adjustable for varying the angle of the illuminating light.

7. The electric soldering iron according to claim 6 further comprising
- a bolt attached to one end of the cylinder and extending to the casing for adjusting the position of the light source and cylinder relative to the soldering bit, and
- a mask incorporated in the plastic cylinder for limiting the flow of light coming from the light source.

8. The electric soldering iron according to claim 1 further comprising
- electronic controls for the heating element including a potentiometer and a switch disposed at the handle of the casing in order to regulate the temperature at the soldering bit and suitable to effect uniform soldering.

9. The electric soldering iron according to claim 1 further comprising
- an iron plate with vacuum cups underneath for obtaining a firm hold on a work surface, said iron plate forming a stand for the soldering iron; and
- a permanent magnet mounted at the bottom of the handle of the casing for maintaining the soldering iron in an upright position when placed on the iron plate.

* * * * *